(12) United States Patent
Seki et al.

(10) Patent No.: US 11,533,408 B2
(45) Date of Patent: Dec. 20, 2022

(54) SHEET CONVEYANCE DEVICE AND IMAGE FORMING APPARATUS

(71) Applicant: KONICA MINOLTA, INC., Tokyo (JP)

(72) Inventors: Hirotada Seki, Toyokawa (JP); Hitoshi Asano, Toyokawa (JP); Yumiko Izumiya, Hachioji (JP); Akimasa Ishikawa, Toyokawa (JP); Kazutoshi Yoshimura, Hino (JP); Yasuo Koyanagi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/513,778

(22) Filed: Oct. 28, 2021

(65) Prior Publication Data
US 2022/0191340 A1 Jun. 16, 2022

(30) Foreign Application Priority Data
Dec. 11, 2020 (JP) .............................. JP2020-205532

(51) Int. Cl.
*G06K 15/00* (2006.01)
*H04N 1/00* (2006.01)
(52) U.S. Cl.
CPC ....... *H04N 1/00726* (2013.01); *H04N 1/0057* (2013.01); *H04N 1/00708* (2013.01); *H04N 1/00732* (2013.01); *H04N 1/00779* (2013.01)

(58) Field of Classification Search
CPC ............. H04N 1/00726; H04N 1/0057; H04N 1/00708; H04N 1/00732; H04N 1/00779
See application file for complete search history.

(56) References Cited

U.S. PATENT DOCUMENTS

| 2008/0036137 A1* | 2/2008 | Moteki | .................. B65H 9/002 271/228 |
| 2018/0170701 A1* | 6/2018 | Mizuguchi | ............. B65H 9/004 |

FOREIGN PATENT DOCUMENTS

JP 2010049178 A 3/2010

* cited by examiner

*Primary Examiner* — Moustapha Diaby
(74) *Attorney, Agent, or Firm* — Holtz, Holtz & Volek PC (57) ABSTRACT

To provide a sheet conveyance device capable of preventing degradation in quality of conveying a sheet and image quality even when a stiffness of the sheet is different between a sheet conveyance direction and a sheet width direction. A sheet conveyance device of an image forming apparatus includes an image forming part that conveys a sheet along a conveyance path; and a stiffness acquisition part that acquires a stiffness of the sheet in a first direction including a component in the sheet conveyance direction by bending the sheet in the first direction, and acquires a stiffness of the sheet in a second direction including a component in the sheet width direction orthogonal to the sheet conveyance direction by bending the sheet in the second direction.

22 Claims, 8 Drawing Sheets

SHEET CONVEYANCE DEVICE AND IMAGE FORMING APPARATUS

CROSS-REFERENCE TO RELATED APPLICATIONS

The entire disclosure of Japanese patent Application No. 2020-205532, filed on Dec. 11, 2020, is incorporated herein by reference in its entirety.

BACKGROUND

Technological Field

The present invention relates to a sheet conveyance device and an image forming apparatus.

DESCRIPTION OF THE RELATED ART

In an image forming apparatus that forms an image on a sheet, there is known a technique of detecting a stiffness of the sheet and setting various control parameters on the basis of a result of the detection. As a technique for detecting a stiffness of a sheet, for example, Patent Literature 1 describes a technique in which a sheet being conveyed is pressed against a lever, and an amount of displacement of the lever at that time is detected as the stiffness of the sheet.

RELATED ART LITERATURE

Patent Literature

Patent Literature 1: JP 2010-49178 A

SUMMARY

A stiffness of a sheet may be different between a sheet conveyance direction (sheet length direction) and a sheet width direction. In such a case, an appropriate control parameter is not set in performing image formation and sheet conveyance, and appropriate correction of curl generated on the sheet and appropriate sheet conveyance cannot be performed, which may cause problems such as occurrence of a paper jam (jam) and degradation in image quality due to wrinkles of the sheet. The technique described in Patent Literature 1 is a technique for detecting the stiffness of the sheet in the sheet conveyance direction, and cannot detect the stiffness of the sheet in the sheet width direction. For that reason, an appropriate control parameter cannot therefore be set when the stiffness of the sheet is different between the sheet conveyance direction and the sheet width direction, and there has been a problem that quality of conveying the sheet and the image quality are degraded.

The present invention has been made to solve problems described above, and an object of the present invention is to provide a sheet conveyance device and an image forming apparatus capable of preventing degradation in quality of conveying a sheet and image quality even when a stiffness of the sheet is different between the sheet conveyance direction and the sheet width direction.

A sheet conveyance device according to the present invention includes: a sheet conveyance part that conveys a sheet along a conveyance path; and a stiffness acquisition part that acquires a stiffness of the sheet in a first direction including a component of a sheet conveyance direction by bending the sheet in the first direction, and acquires a stiffness of the sheet in a second direction including a component in a sheet width direction orthogonal to the sheet conveyance direction by bending the sheet in the second direction.

An image forming apparatus according to the present invention includes the sheet conveyance device having the configuration described above, and an image forming part that forms an image on a sheet conveyed by the sheet conveyance device.

According to an embodiment of the present invention, it is possible to prevent degradation in quality of conveying a sheet and image quality even when a stiffness of the sheet is different between the sheet conveyance direction and the sheet width direction.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, embodiments of the present invention will be described in detail with reference to the drawings. In the present specification and the drawings, elements having substantially the same function or configuration are denoted by the same reference numerals, and redundant description is omitted.

First Embodiment (Overall Configuration of Image Forming Apparatus)

Figure 1:
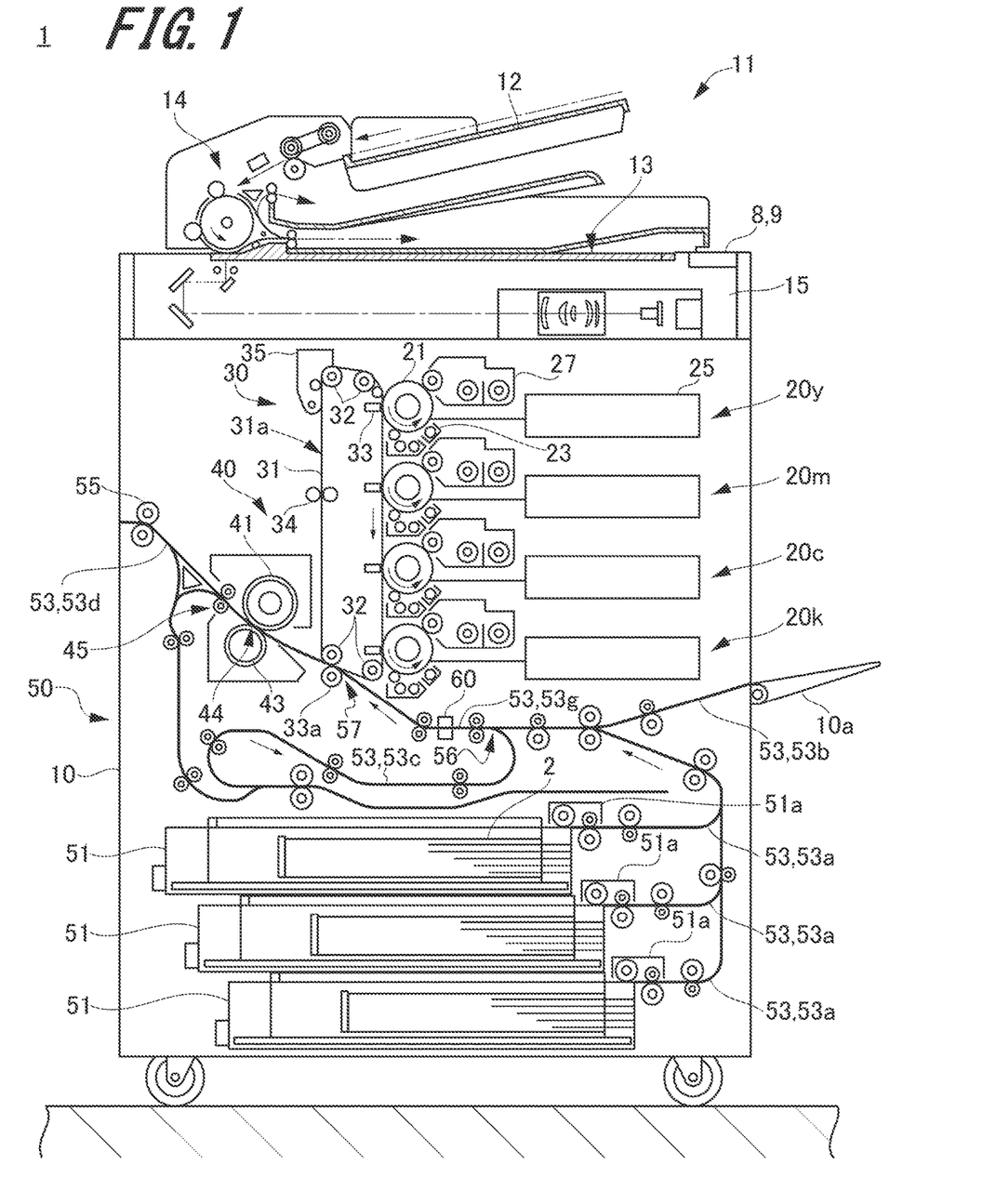
FIG. 1 is a schematic diagram illustrating an overall configuration of an image forming apparatus according to a first embodiment of the present invention.

FIG. 1 is a schematic diagram illustrating an overall configuration of an image forming apparatus according to a first embodiment of the present invention.

As illustrated in FIG. 1, an image forming apparatus 1 is an electrophotographic image forming apparatus. The image forming apparatus 1 includes an image reading unit 11 on a housing 10 that is an apparatus main body. In addition, the image forming apparatus 1 includes an image forming part 30, a fixing part 40, a sheet conveyance part 50, and a stiffness acquisition part 60 in the housing 10. The image forming apparatus 1 further includes an operation unit 8 and a display unit 9. The sheet conveyance part 50 and the stiffness acquisition part 60 are elements constituting the sheet conveyance device together with a sheet conveyance controller 71a and a calculator 71c that are described later.

(Image Reading Unit)

The image reading unit 11 includes a document tray 12, a document table 13, an automatic document feeding mechanism 14, and an imaging unit 15. The automatic document feeding mechanism 14 feeds a document placed on the document tray 12 to the document table 13. The image reading unit 11 reads an image of a document directly placed on the document table 13 or an image of a document fed to the document table 13 by the automatic document feeding mechanism 14 by the imaging unit 15 to generate image data. Note that, image data to be subjected to a print job may be not only the image data read by the imaging unit 15 but also image data received from an external device connected to the image forming apparatus 1 via a network. The external device is, for example, a personal computer or another image forming apparatus.

(Image Forming Part)

The image forming part 30 is a part that forms an image on a sheet 2. The image forming part 30 includes four image forming units 20y, 20m, 20c, and 20k that produce toner images of respective colors of yellow, magenta, cyan, and black, and an intermediate transfer belt 31 as an intermediate transfer body. The image forming unit 20y includes a photoreceptor 21, a charging device 23, an optical scanning device 25, and a developing device 27, and also the other image forming units 20m, 20c, and 20k each include a photoreceptor 21, a charging device 23, an optical scanning device 25, and a developing device 27.

The photoreceptor 21 is an image carrier that carries a toner image, and is formed in a drum shape. The photoreceptor 21 rotates in accordance with driving of a photoreceptor drive motor (not illustrated). The charging device 23, the optical scanning device 25, and the developing device 27 are arranged in order from the upstream side to the downstream side in a rotation direction of the photoreceptor 21 around the photoreceptor 21.

The outer peripheral surface of the photoreceptor 21 is an image carrying surface. The image carrying surface of the photoreceptor 21 is uniformly charged by the charging device 23, and an electrostatic latent image is formed on the charged image carrying surface by exposure scanning by the optical scanning device 25. The exposure scanning by the optical scanning device 25 is performed on the basis of image data read by the image reading unit 11 or image data received from an external device.

The developing device 27 develops the electrostatic latent image by causing the toner to adhere to the electrostatic latent image by supplying toner to the image carrying surface of the photoreceptor 21 on which the electrostatic latent image is formed. As a result, a yellow toner image is formed on the image carrying surface of the photoreceptor 21 included in the image forming unit 20y. In addition, a magenta toner image is formed on the surface of the photoreceptor 21 included in the image forming unit 20m, a cyan toner image is formed on the photoreceptor 21 included in the image forming unit 20c, and a black toner image is formed on the photoreceptor 21 included in the image forming unit 20k.

The intermediate transfer belt 31 is an endless belt and is provided to be rotatable. The intermediate transfer belt 31 is supported by a plurality of belt support rollers 32. On a moving path of the intermediate transfer belt 31, a primary transfer unit 33, a secondary transfer roller 33a, a static elimination roller 34, and a cleaning unit 35 are disposed.

The intermediate transfer belt 31 is stretched around the plurality of belt support rollers 32 and disposed in a loop shape. The outer peripheral surface of the intermediate transfer belt 31 is an image carrying surface 31a. The image carrying surface 31a is disposed in a state of being in contact with the outer peripheral surface of each of the photoreceptors 21 of the image forming units 20y, 20m, 20c, and 20k. The intermediate transfer belt 31 rotates in a direction opposite to rotation of each of the photoreceptors 21 of the image forming units 20y, 20m, 20c, and 20k. Specifically, each photoreceptor 21 rotates in the counterclockwise direction in FIG. 1, and the intermediate transfer belt 31 rotates in the clockwise direction in FIG. 1.

The plurality of belt support rollers 32 is disposed on the inner peripheral side of the intermediate transfer belt 31. The plurality of belt support rollers 32 supports the intermediate transfer belt 31 such that the image carrying surface 31a of the intermediate transfer belt 31 is in contact with all of the four photoreceptors 21 corresponding to the four image forming units 20y, 20m, 20c, and 20k. One of the plurality of belt support rollers 32 is configured as a belt drive roller for rotating the intermediate transfer belt 31.

The primary transfer units 33 are disposed one by one at positions facing the respective photoreceptors 21. Each of the primary transfer units 33 is disposed on the inner peripheral side of the intermediate transfer belt 31, and is disposed in a state of sandwiching the intermediate transfer belt 31 between the photoreceptor 21 corresponding to each primary transfer unit 33. Each primary transfer unit 33 transfers the toner adhering to the image carrying surface of the photoreceptor 21 to the image carrying surface 31a of the intermediate transfer belt 31 by applying a charge having a polarity opposite to that of the toner to the intermediate transfer belt 31.

The secondary transfer roller 33a transfers the toner image transferred to the image carrying surface 31a of the intermediate transfer belt 31 to the sheet 2. The secondary transfer roller 33a is disposed in a state of facing one of the plurality of belt support rollers 32 described above. The secondary transfer roller 33a is disposed in a state of sandwiching the intermediate transfer belt 31 between the secondary transfer roller 33a and the belt support roller 32. A position where the secondary transfer roller 33a and the belt support roller 32 are in contact with each other is a transfer position 57 at the time of transferring the toner image transferred to the image carrying surface 31a of the intermediate transfer belt 31 to the sheet 2. The transfer position 57 corresponds to an image forming position. The image forming position is a position where an image is formed on the sheet 2.

The static elimination roller 34 is disposed at a location that is on the upstream side of the primary transfer unit 33 facing the photoreceptor 21 of the image forming unit 20y and is on the downstream side of the secondary transfer roller 33a, in the rotation direction of the intermediate transfer belt 31. The static elimination roller 34 is for eliminating the charge remaining on the intermediate transfer belt 31, and includes a pair of rollers sandwiching the intermediate transfer belt 31.

The cleaning unit 35 is disposed at a location that is on the upstream side of the primary transfer unit 33 facing the photoreceptor 21 of the image forming unit 20y and is on the downstream side of the static elimination roller 34, in the rotation direction of the intermediate transfer belt 31. The cleaning unit 35 is for removing toner remaining on the image carrying surface 31a of the intermediate transfer belt 31, and is disposed in a state of facing the image carrying surface 31a.

(Fixing Part)

The fixing part 40 includes a fixing roller 41 and a pressure roller 43. A heater (not illustrated) is built in the fixing roller 41. The pressure roller 43 is pressed against the fixing roller 41. As a result, the fixing roller 41 and the pressure roller 43 are pressure-bonded to each other, and a fixing nip part 44 is formed in this pressure-bonded part. The sheet 2 is heated and pressurized when passing through the fixing nip part 44, whereby the toner image is fixed on the sheet 2. A decurling part 45 is disposed on the downstream side of the fixing nip part 44. The decurling part 45 corrects a curl of the sheet 2. The decurling part 45 includes a pair of decurling rollers.

(Sheet Conveyance Part)

The sheet conveyance part 50 includes a plurality of sheet feed trays 51, a conveyance path 53 for conveying the sheet 2, and a plurality of conveyance rollers for applying a conveyance force to the sheet 2 on the conveyance path 53. In a lower part of the housing 10, the plurality of sheet feed trays 51 is provided so that sheets 2 having different sizes and types can be stored separately. Each of the sheet feed trays 51 is provided to be able to be taken in/out to/from the housing 10. The sheet feeder 51a separates the sheets 2 stored in the sheet feed tray 51 one by one and supplies the separated sheets to the conveyance path 53. Note that, the sheet feeder 51a may be one that supplies a sheet stored in a large-capacity sheet feeding apparatus installed separately from the image forming apparatus 1 to the conveyance path 53.

The conveyance path 53 includes an individual conveyance path 53a that conveys the sheet 2 supplied from each sheet feed tray 51 one by one toward the transfer position 57. In addition, the image forming apparatus 1 includes a manual feed tray 10a outside the housing 10, and the conveyance path 53 includes a manual feed conveyance path 53b extending from the manual feed tray 10a. The sheet 2 supplied from the manual feed tray 10a is conveyed to the transfer position 57 via the manual feed conveyance path 53b and the individual conveyance path 53a in order. In addition, the conveyance path 53 includes a reverse conveyance path 53c for reversing the front and back of the sheet 2 having passed through the fixing part 40 and feeding the sheet 2 to the transfer position 57 again, and an ejection conveyance path 53d for ejecting the sheet 2 having passed through the fixing part 40.

The individual conveyance path 53a, the manual feed conveyance path 53b, and the reverse conveyance path 53c described above extends from the merging position 56 to the transfer position 57 as one merging conveyance path 53g by merging at a merging position 56. For this reason, the sheet 2 supplied from each sheet feed tray 51, the sheet 2 supplied from the manual feed tray 10a, and the sheet 2 supplied from the reverse conveyance path 53c are all fed to the transfer position 57 through the merging conveyance path 53g. On the other hand, the ejection conveyance path 53d is a conveyance path for conveying the sheet 2 having passed through the fixing part 40 to an ejection roller 55. The ejection roller 55 is a roller for ejecting the sheet 2 on which image formation has been completed to an ejection tray or the like. The ejection roller 55 constitutes a sheet ejector. The conveyance path 53 from the sheet feeder 51a to the ejection roller 55 through the merging position 56, the transfer position 57, and the fixing nip part 44 in order corresponds to a first conveyance path. On the other hand, the reverse conveyance path 53c corresponds to a second conveyance path. The reverse conveyance path 53c branches from the decurling part 45 located on the upstream side in the sheet conveyance direction from of the ejection roller 55. The reverse conveyance path 53c merges with the individual conveyance path 53a and the manual feed conveyance path 53b at the merging position 56.

(Operation Unit)

The operation unit 8 is operated by a user who uses the image forming apparatus 1. The user inputs various settings, conditions, and the like related to image formation by operating the operation unit 8. The operation unit 8 may be, for example, an operation key provided on an upper surface part of the housing 10 or a touch panel provided on a display surface of the display unit 9. The operation unit 8 may be provided in an external device such as a personal computer connected to the image forming apparatus 1.

(Display Unit)

The display unit 9 is for displaying various settings, conditions, and the like related to image formation. The display unit 9 includes, for example, a thin display provided on an upper surface part of the housing 10. The display unit 9 may include a touch panel as the operation unit 8 on the display surface. The display unit 9 may be provided in an external device such as a personal computer connected to the image forming apparatus 1.

(Stiffness Acquisition Part)

The stiffness acquisition part 60 acquires a stiffness of the sheet 2. The stiffness of the sheet 2 is an index indicating resistance when the sheet 2 is bent, and can be represented by various physical quantities. The stiffness acquisition part 60 is disposed on the conveyance path 53 that is on the downstream side in the sheet conveyance direction from the merging position 56 and is on the upstream side in the sheet conveyance direction from the transfer position 57. As a result, when duplex printing is executed for forming an image on a first surface and a second surface of the sheet 2, it is possible to acquire, by the stiffness acquisition part 60, the stiffness of the sheet 2 before an image is formed on the first surface and the stiffness of the sheet 2 before an image is formed on the second surface. The stiffness of the sheet 2 before an image is formed on the second surface may be changed due to image formation on the first surface performed before the image formation, particularly fixing of a toner image. If the stiffness acquisition part 60 is disposed as described above, it is possible to cope with such a change in stiffness.

The stiffness acquisition part 60 includes a first stiffness acquisition unit and a second stiffness acquisition unit. The first stiffness acquisition unit is a unit that acquires the stiffness of the sheet 2 in a first direction by bending the sheet 2 in the first direction including a component in the sheet conveyance direction. The second stiffness acquisition unit is a unit that acquires the stiffness of the sheet 2 in a second direction by bending the sheet 2 in the second direction including a component in the sheet width direction orthogonal to the sheet conveyance direction.

The above-described "first direction including a component in the sheet conveyance direction" is a direction in which a bending component in the sheet conveyance direction is included in a bending component of the sheet 2 when the sheet 2 is bent in the first direction. In addition, the above-described "second direction including a component in the sheet width direction" is a direction in which a bending component in the sheet width direction is included in a bending component of the sheet 2 when the sheet 2 is bent in the second direction. In the present embodiment, as an example, the first direction is a direction parallel to the sheet conveyance direction, and the second direction is a direction oblique to the sheet conveyance direction, more specifically, an oblique direction at an angle of 45 degrees with respect to the sheet conveyance direction. In the stiffness acquisition part 60, the first stiffness acquisition unit is disposed on the upstream side or the downstream side of the second stiffness acquisition unit. That is, the first stiffness acquisition unit and the second stiffness acquisition unit are arranged to be shifted in position in the sheet conveyance direction. In the present embodiment, as an example, it is assumed that the first stiffness acquisition unit is disposed on the upstream side of the second stiffness acquisition unit. Hereinafter, detailed description will be given of the first stiffness acquisition unit and the second stiffness acquisition unit.

(Configuration of First Stiffness Acquisition Unit)

Figure 2:
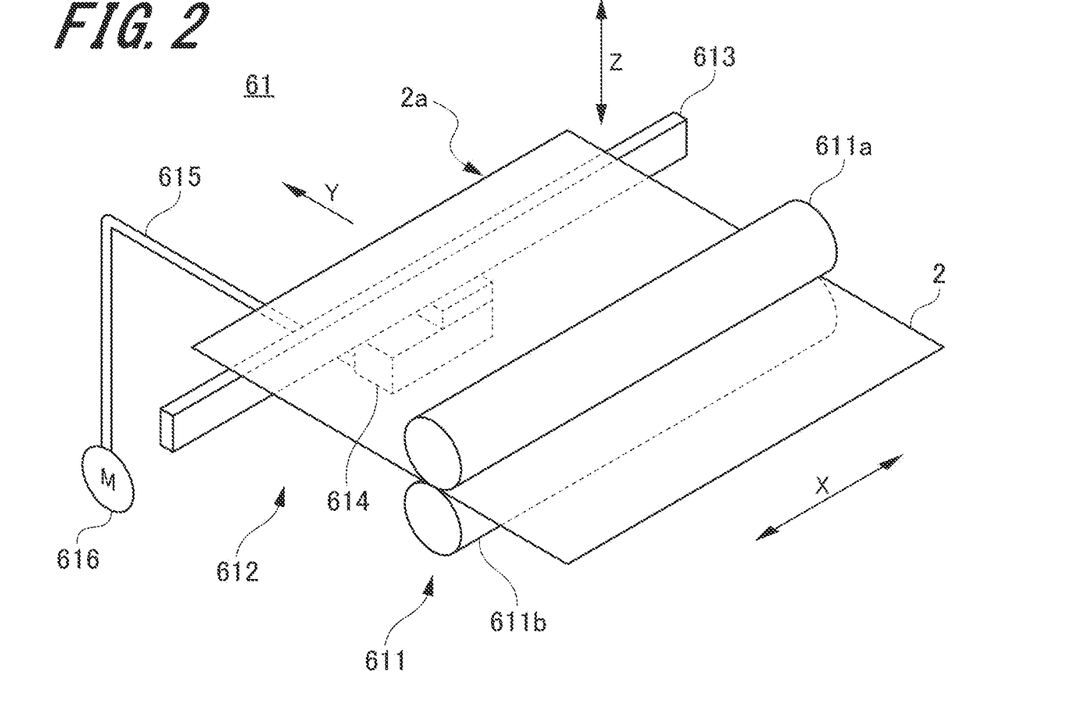
FIG. 2 is a perspective view schematically illustrating a configuration example of a first stiffness acquisition unit.
Figure 3:
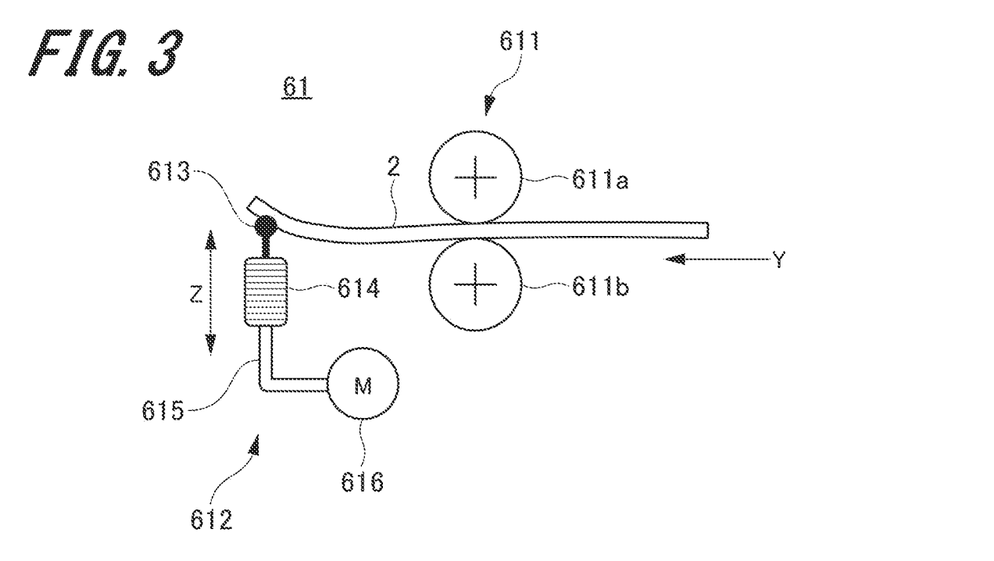
FIG. 3 is a side view schematically illustrating the configuration example of the first stiffness acquisition unit.

FIG. 2 is a perspective view schematically illustrating a configuration example of the first stiffness acquisition unit, and FIG. 3 is a side view schematically illustrating the configuration example of the first stiffness acquisition unit.

As illustrated in FIGS. 2 and 3, a first stiffness acquisition unit 61 includes a sheet holding part 611 that holds the sheet 2, and a pressing part 612 that presses the sheet 2 held by the sheet holding part 611.

The sheet holding part 611 includes a pair of sheet holding rollers 611a and 611b. The central axis of each of the sheet holding rollers 611a and 611b is disposed in parallel to a sheet conveyance direction Y. That is, the sheet holding part 611 is disposed in parallel to the sheet conveyance direction Y. The pair of sheet holding rollers 611a and 611b are rollers that hold the sheet 2 by sandwiching the sheet 2 at a predetermined pressure. The pair of sheet holding rollers 611a and 611b is preferably includes conveyance rollers.

The pressing part 612 includes a push-up member 613 that pushes up the sheet 2, a pressing force detector 614 that detects a pressing force, a support mechanism 615 that movably supports the push-up member 613 in a Z direction, and a motor 616 that moves the push-up member 613 in the Z direction via the support mechanism 615. The push-up member 613 is an elongated member that is long in a sheet width direction X. The sheet width direction X is a direction orthogonal to the sheet conveyance direction Y. The push-up member 613 is formed in a long plate shape to be able to be in contact with the entire width of the sheet 2 conveyed in the sheet conveyance direction Y. The pressing force detector 614 detects a pressing force when the sheet 2 is pushed up by the push-up member 613 to bend the sheet 2 by the push-up member 613, and includes, for example, a pressure sensor. The support mechanism 615 movably supports the push-up member 613 and the pressing force detector 614 in the Z direction. The Z direction is a direction orthogonal to both the sheet width direction X and the sheet conveyance direction Y. In the present embodiment, as an example, the sheet width direction X and the sheet conveyance direction Y are axes of two horizontal directions, and the Z direction is a vertical direction. The motor 616 is a drive source for moving the push-up member 613 and the pressing force detector 614 in the Z direction, and includes, for example, a stepping motor.

The first stiffness acquisition unit 61 configured as described above acquires the stiffness of the sheet 2 by operating as follows.

First, conveyance of the sheet 2 is stopped at a predetermined position in the sheet conveyance direction Y. At this time, the sheet holding part 611 is in a state of sandwiching the sheet 2 between the pair of sheet holding rollers 611a and 611b and holding the sheet 2. The pair of sheet holding rollers 611a and 611b is in a state of holding the sheet 2 over the entire width in the sheet width direction X. The sheet holding part 611 holds the sheet 2 at a position away from a leading end 2a of the sheet 2 by a first distance. The leading end 2a of the sheet 2 refers to an end of the sheet 2 disposed facing the downstream side in the sheet conveyance direction Y.

Next, the pressing part 612 moves the push-up member 613 upward by driving of the motor 616. As a result, the sheet 2 is pushed up and bent by the push-up member 613 as illustrated in FIG. 3. At this time, a position at which the push-up member 613 starts to come into contact with a sheet surface (lower surface) of the sheet 2 in a state where the sheet 2 is not bent is set as a home position of the push-up member 613 in the Z direction. Then, when the sheet 2 is bent by a predetermined amount (for example, 3 mm) by the push-up member 613 from the home position, a pressing force received from the sheet 2 is detected by the pressing force detector 614. The pressing part 612 presses the sheet 2 by pressing the push-up member 613 against the sheet 2 at a position away from the leading end 2a of the sheet 2 by a second distance shorter than the first distance. An amount of push-up of the sheet 2 by the push-up member 613 can be grasped by the number of pulse signals input to a driver of the motor 616. As described above, the first stiffness acquisition unit 61 measures the stiffness of the sheet 2 by the pressing force when the sheet 2 is bent. In other words, the first stiffness acquisition unit 61 acquires, as the stiffness of the sheet 2, the pressing force detected by the pressing force detector 614 when the sheet 2 is bent by the push-up member 613. The stiffness of the sheet 2 obtained in this manner is the stiffness of the sheet 2 in the sheet conveyance direction Y.

(Configuration of Second Stiffness Acquisition Unit)

Figure 4:
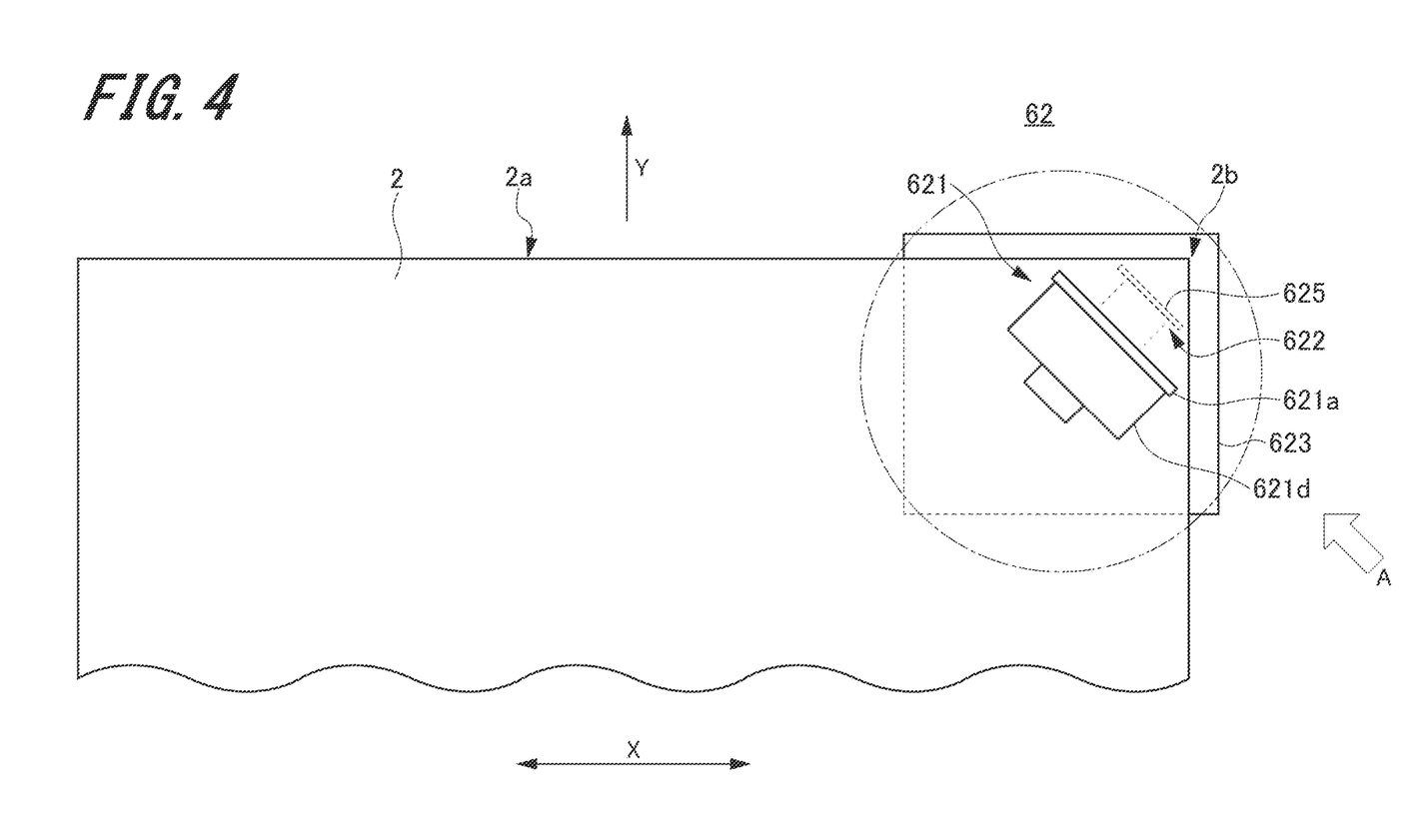
FIG. 4 is a plan view schematically illustrating a configuration example of a second stiffness acquisition unit.
Figure 5:
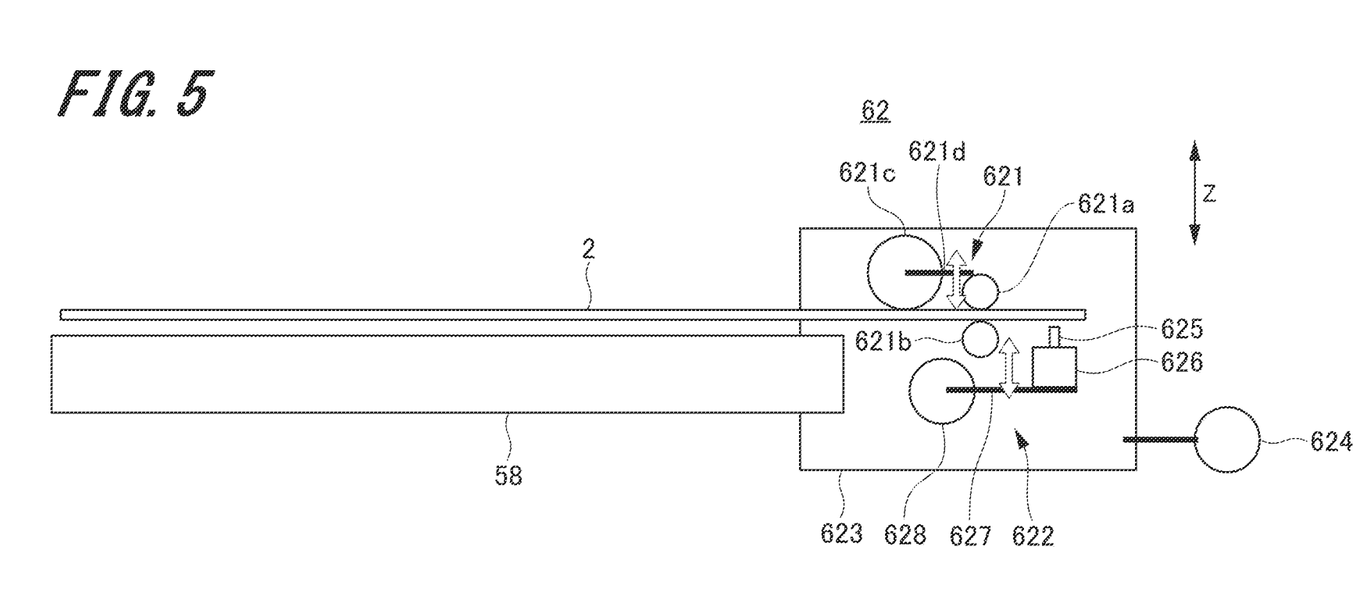
FIG. 5 is a schematic diagram of the second stiffness acquisition unit illustrated in FIG. 4 as viewed from a direction A.

FIG. 4 is a plan view schematically illustrating a configuration example of the second stiffness acquisition unit, and FIG. 5 is a schematic diagram of the second stiffness acquisition unit illustrated in FIG. 4 as viewed from a direction A.

As illustrated in FIGS. 4 and 5, a second stiffness acquisition unit 62 includes a sheet holding part 621 that holds the sheet 2, a pressing part 622 that presses the sheet 2 held by the sheet holding part 621, a unit base 623 on which the sheet holding part 621 and the pressing part 622 are mounted, and a motor 624 for moving the unit base 623 in the sheet width direction X. Note that, a conveyance guide member 58 illustrated in FIG. 5 is a member that guides the conveyance of the sheet 2 on the conveyance path 53.

The sheet holding part 621 includes a pair of sheet holding rollers 621a and 621b and a motor 621c that generates a nip pressure between the pair of sheet holding rollers 621a and 621b. The central axis of each of the sheet holding rollers 621a and 621b is disposed with an inclination of 45 degrees with respect to the sheet conveyance direction Y. That is, the sheet holding part 621 is disposed in parallel to an oblique direction at an angle of 45 degrees with respect to the sheet conveyance direction Y. The sheet holding roller 621a is movably supported in the Z direction by a roller support member 621d. The motor 621c moves the sheet holding roller 621a in the Z direction via the roller support member 621d. In addition, the motor 621c generates a nip pressure between the sheet holding rollers 621a and 621b by pressing the sheet holding roller 621a against the sheet holding roller 621b. The pair of sheet holding rollers 621a and 621b holds the sheet 2 by sandwiching the sheet 2 by the nip pressure.

The pressing part 622 includes a push-up member 625 that pushes up the sheet 2, a pressing force detector 626 that detects a pressing force, a support mechanism 627 that movably supports the push-up member 625 in the Z direction, and a motor 628 that moves the push-up member 625 in the Z direction via the support mechanism 627. The push-up member 625 is an elongated member that is long in one direction. The push-up member 625 is disposed in parallel to the oblique direction at the angle of 45 degrees with respect to the sheet conveyance direction Y. The longitudinal direction of the push-up member 625 is parallel to a central axis direction of the sheet holding rollers 621a and 621b. The pressing force detector 626 detects a pressing force when the sheet 2 is pushed up by the push-up member 625, and includes, for example, a pressure sensor. The support mechanism 627 movably supports the push-up member 625 and the pressing force detector 626 in the Z direction. The motor 628 is a drive source for moving the push-up member 625 and the pressing force detector 626 in the Z direction, and includes, for example, a stepping motor.

The unit base 623 is provided to be movable in the sheet width direction X by a movement guide mechanism (not illustrated). When the unit base 623 moves, the pair of sheet holding rollers 621a and 621b is held in a state of being separated from each other.

The motor 624 is a drive source for moving the sheet holding part 621 and the pressing part 622 mounted on the unit base 623 in the sheet width direction X integrally with the unit base 623, and includes, for example, a stepping motor. An amount of movement and a moving direction of the unit base 623 in the sheet width direction X can be controlled by a pulse signal input to a driver of the motor 624.

The second stiffness acquisition unit 62 configured as described above acquires the stiffness of the sheet 2 by operating as follows.

First, when the conveyance of the sheet 2 is stopped at a predetermined position in the sheet conveyance direction Y, the unit base 623 moves to a corner 2b of the sheet 2 by driving of the motor 624 (see FIG. 4). At this time, a position where the sheet 2 stops is a position on the downstream side from a case where the stiffness of the sheet 2 is detected by the first stiffness acquisition unit 61. The moving direction and the amount of movement of the unit base 623 are controlled depending on a dimension of the sheet 2 in a direction orthogonal to the sheet conveyance direction Y, that is, a dimension of a sheet width. Operation of moving the unit base 623 to the corner 2b of the sheet 2 may be executed after the conveyance of the sheet 2 is stopped, or may be executed before the conveyance of the sheet 2 is stopped. In consideration of efficiency, the latter is more preferable. The sheet width can be detected by using a sheet size detection sensor (not illustrated) included in the sheet conveyance part 50. Next, the sheet holding part 621 holds the sheet 2 by sandwiching the sheet 2 between the pair of sheet holding rollers 621a and 621b by driving of the motor 621c. The sheet holding part 621 holds the sheet 2 at a position away from the corner 2b of the sheet 2 by a third distance in an oblique direction at an angle of 45 degrees. The third distance is the same distance as the first distance described above.

Next, the pressing part 622 moves the push-up member 625 upward by driving of the motor 628. As a result, the sheet 2 is pushed up and bent by the push-up member 625. At this time, a position at which the push-up member 625 starts to come into contact with a sheet surface (lower surface) of the sheet 2 in a state where the sheet 2 is not bent is set as a home position of the push-up member 625 in the Z direction. Then, when the sheet 2 is bent by a predetermined amount (for example, 3 mm) by the push-up member 625 from the home position, a pressing force received from the sheet 2 is detected by the pressing force detector 626. The pressing part 622 presses the sheet 2 by pressing the push-up member 625 against the sheet 2 at a position away from the corner 2b of the sheet 2 by a fourth distance in an oblique direction at an angle of 45 degrees. The fourth distance is the same distance as the second distance described above. The fourth distance is therefore shorter than the third distance. An amount of push-up of the sheet 2 by the push-up member 625 can be grasped by the number of pulse signals input to a driver of the motor 628. As described above, the second stiffness acquisition unit 62 measures the stiffness of the sheet 2 by the pressing force when the sheet 2 is bent. In other words, the second stiffness acquisition unit 62 acquires, as the stiffness of the sheet 2, the pressing force detected by the pressing force detector 626 when the sheet 2 is bent by the push-up member 625. The stiffness of the sheet 2 obtained in this manner is the stiffness of the sheet 2 in an oblique direction at an angle of 45 degrees with respect to the sheet conveyance direction Y.

Figure 6:
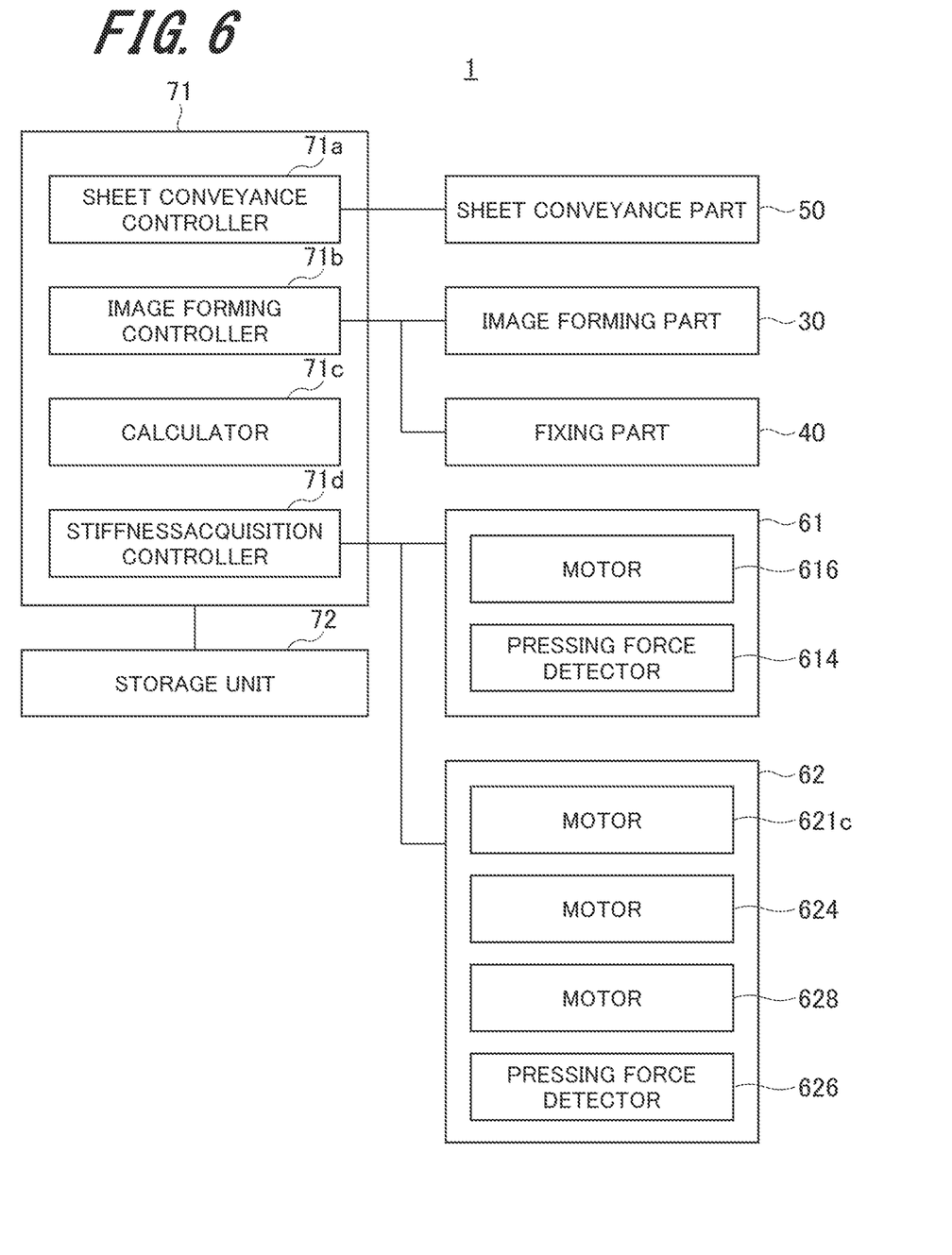
FIG. 6 is a block diagram illustrating a configuration example of a control system of the image forming apparatus according to the first embodiment of the present invention.

FIG. 6 is a block diagram illustrating a configuration example of a control system of the image forming apparatus according to the first embodiment of the present invention.

As illustrated in FIG. 6, the image forming apparatus 1 includes a controller 71 and a storage unit 72. The controller 71 comprehensively controls entire operation of the image forming apparatus 1. Although not illustrated, the controller 71 includes, as hardware resources of a computer, a central processing unit (CPU), a read only memory (ROM) for storing programs and the like executed by the CPU, and a random access memory (RAM) used as a work area of the CPU. A program for controlling the image forming apparatus 1 by the computer or a program for controlling the sheet conveyance device included in the image forming apparatus 1 by the computer is provided by being recorded in a computer readable recording medium. Examples of the recording medium include portable recording media such as a hard disk drive (HDD), a CD-ROM, and a DVD disk. Data of the program can also be provided by transmission and reception via the Internet or the like.

The storage unit 72 includes, for example, a nonvolatile semiconductor memory (so-called flash memory), a hard disk drive (HDD), a solid state drive (SSD), or the like. The storage unit 72 stores image data to be subjected to image formation, image data of a document image obtained by reading with the image reading unit 11, and the like. In addition, the storage unit 72 stores data to be referred to when the controller 71 controls operation of each unit of the image forming apparatus 1.

The controller 71 includes the sheet conveyance controller 71a, an image forming controller 71b, the calculator 71c, and a stiffness acquisition controller 71d. The sheet conveyance controller 71a controls sheet conveyance operation by the sheet conveyance part 50. The image forming controller 71b controls image forming operation by the image forming part 30 and the fixing part 40. The calculator 71c performs various types of calculation processing.

The stiffness acquisition controller 71d controls the first stiffness acquisition unit 61 and the second stiffness acquisition unit 62. Specifically, the stiffness acquisition controller 71d controls driving of the motor 616 included in the first stiffness acquisition unit 61, and takes in a detection result by the pressing force detector 614 included in the first stiffness acquisition unit 61. The stiffness acquisition controller 71d individually controls driving of the motors 621c, 624, and 628 included in the second stiffness acquisition unit 62, and takes in a detection result of the pressing force detector 626 included in the second stiffness acquisition unit 62.

Figure 7:
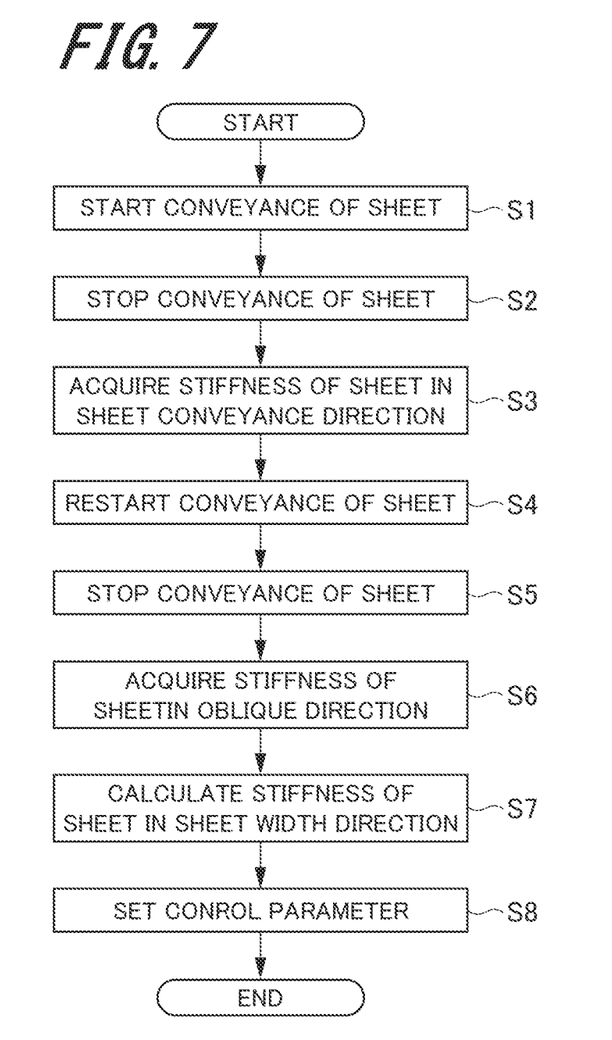
FIG. 7 is a flowchart illustrating an example of a processing procedure of the image forming apparatus according to the first embodiment of the present invention.

FIG. 7 is a flowchart illustrating an example of a processing procedure of the image forming apparatus according to the first embodiment of the present invention.

First, when a print job is started, the sheet conveyance controller 71a controls driving of the sheet conveyance part 50 to supply the sheet 2 designated in the print job from the sheet feed tray 51 and convey the supplied sheet 2 along the individual conveyance path 53a and the merging conveyance path 53g (step S1).

Next, when the leading end of the sheet 2 reaches the stiffness acquisition part 60 on the merging conveyance path 53g, the sheet conveyance controller 71a controls driving of the sheet conveyance part 50 to stop conveyance of the sheet 2 (step S2). At this time, as illustrated in FIG. 2 described above, the sheet 2 stops when the leading end 2a of the sheet 2 passes through a position of the push-up member 613 in the first stiffness acquisition unit 61.

Next, the stiffness acquisition controller 71d operates the first stiffness acquisition unit 61 to acquire the stiffness of the sheet 2 in the sheet conveyance direction Y (step S3). At this time, the stiffness acquisition controller 71d controls driving of the motor 616 included in the first stiffness acquisition unit 61 to push up the sheet 2 by a predetermined amount by the push-up member 613. In addition, the stiffness acquisition controller 71d detects (measures), with the pressing force detector 614, the pressing force received from the sheet 2 when the sheet 2 is bent by a predetermined amount by being pushed up by the push-up member 613, and takes in a result of the detection. As a result, the stiffness of the sheet 2 in the sheet conveyance direction Y is obtained.

Note that, although not illustrated, when acquisition of the stiffness by the first stiffness acquisition unit 61 is completed, the stiffness acquisition controller 71d controls driving of the motor 616 to release a push-up state of the sheet 2 by the push-up member 613. The push-up state of the sheet 2 by the push-up member 613 is released by movement of the push-up member 613 downward from the home position by driving of the motor 616.

Next, the sheet conveyance controller 71a controls driving of the sheet conveyance part 50 to restart the conveyance of the sheet 2 (step S4) and then stops the conveyance of the sheet 2 (step S5). At this time, as illustrated in FIG. 4 described above, the sheet 2 stops when the leading end 2a of the sheet 2 passes through a position of the push-up member 625 in the second stiffness acquisition unit 62.

Next, the stiffness acquisition controller 71d operates the second stiffness acquisition unit 62 to acquire the stiffness of the sheet 2 in an oblique direction (oblique direction at an angle of 45 degrees in the present embodiment) with respect to the sheet conveyance direction Y (step S6). At this time, the stiffness acquisition controller 71d controls driving of the motor 624 included in the second stiffness acquisition unit 62 to move the unit base 623 to a corner of the sheet 2. In addition, the stiffness acquisition controller 71d controls driving of the motors 621c and 628 included in the second stiffness acquisition unit 62 to push up the sheet 2 by a predetermined amount by the push-up member 625 in a state where the sheet 2 is held by the sheet holding part 621. In addition, the stiffness acquisition controller 71d detects (measures), with the pressing force detector 626, the pressing force received from the sheet 2 when the sheet 2 is bent by a predetermined amount by being pushed up by the push-up member 625, and takes in a result the detection. As a result, the stiffness of the sheet 2 in the oblique direction with respect to the sheet conveyance direction Y is obtained.

Note that, although not illustrated, when acquisition of the stiffness by the second stiffness acquisition unit 62 is completed, the stiffness acquisition controller 71d controls driving of the motors 621c and 628 to release a push-up state of the sheet 2 by the push-up member 625 and then release a holding state of the sheet 2 by the sheet holding part 621. The push-up state of the sheet 2 by the push-up member 625 is released by movement of the push-up member 625 downward from the home position by driving of the motor 628. The holding state of the sheet 2 by the sheet holding part 621 is released by separation of the sheet holding roller 621a from the sheet holding roller 621b by driving of the motor 621c.

Next, the calculator 71c calculates the stiffness of the sheet 2 in the sheet width direction X (step S7). Hereinafter, a specific calculation method will be described.

First, the calculator 71c calculates the stiffness per unit area on the basis of the stiffness of the sheet 2 in the sheet conveyance direction Y obtained in step S3 described above and the stiffness of the sheet 2 in the oblique direction with respect to the sheet conveyance direction Y obtained in step S6 described above.

Here, assuming that the stiffness in a pressing target area of the sheet 2 in the sheet conveyance direction Y obtained in step S3 is Pfd (kgf), the calculator 71c obtains a stiffness Pa (kgf/mm$^2$) per unit area with respect to the stiffness of the sheet 2 in the sheet conveyance direction Y by the following equation (1).

$$Pa = Pfd/(L1 \cdot H1) \tag{1}$$

Figure 8A:
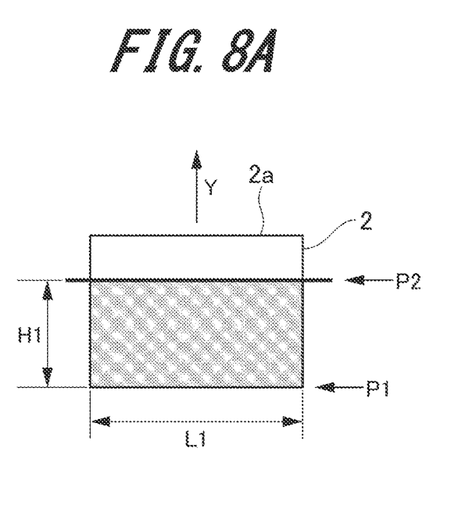
FIG. 8A is a diagram for describing a method of calculating a stiffness per unit area with respect to a stiffness of a sheet in a sheet conveyance direction.

In the equation (1) described above, L1 is a length (mm) at which the pair of sheet holding rollers 611a and 611b comes into contact with the sheet 2, at a holding position P1 of the sheet 2 by the sheet holding part 611, as illustrated in FIG. 8A. In addition, L1 is also a length at which the push-up member 613 comes into contact with the sheet 2, at a pressing position P2 of the sheet 2 by the pressing part 612. L1 corresponds to a width of the sheet 2. On the other hand, H1 is a length (mm) between the holding position P1 and the pressing position P2 of the sheet 2 in the sheet conveyance direction Y. H1 corresponds to a difference between the first distance and the second distance described above.

In addition, assuming that the stiffness in a pressing target area of the sheet 2 in the oblique direction obtained in step S6 is Psl (kgf), the calculator 71c obtains a stiffness Pb (kgf/mm$^2$) per unit area with respect to the stiffness of the sheet 2 in the oblique direction by the following equation (2).

$$Pb = Psl/\{(La+Lb) \cdot H2/2\} \tag{2}$$

Figure 8B:
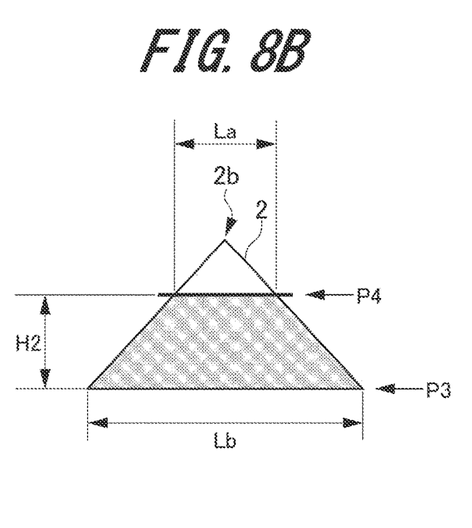
FIG. 8B is a diagram for describing a method of calculating a stiffness per unit area with respect to a stiffness of a sheet in an oblique direction.

In the equation (2) described above, La is a length (mm) at which the push-up member 625 comes into contact with the sheet 2, at a pressing position P4 of the sheet 2 by the pressing part 622, as illustrated in FIG. 8B. In addition, Lb is a length (mm) at which the pair of sheet holding rollers 621a and 621b comes in contact with the sheet 2, at a holding position P3 of the sheet 2 by the sheet holding part 621. On the other hand, H2 is a length (mm) between the holding position P3 and the pressing position P4 of the sheet 2 in the oblique direction at the angle of 45 degrees with respect to the sheet conveyance direction Y. H2 corresponds to a difference between the third distance and the fourth distance described above.

As a result of experiments, the inventor has found that a relationship of the following equation (3) is established between the stiffnesses Pa and Pb and a stiffness Pc per unit area of the sheet 2 in the sheet width direction X. Thus, next, the calculator 71c obtains the stiffness Pc of the sheet 2 in the sheet width direction X on the basis of the following equation (3), on the basis of the stiffnesses Pa and Pb per unit area obtained as described above.

$$Pb=(Pa+Pc)/2 \qquad (3)$$

In a calculation result by the calculator 71c described above, the stiffness Pa corresponds to the stiffness of the sheet 2 per unit area in the sheet conveyance direction Y, and the stiffness Pc corresponds to the stiffness of the sheet 2 per unit area in the sheet width direction X. A magnitude relationship between the stiffness Pa and the stiffness Pc is an index for determining a grain direction of the sheet 2. Specifically, in a case of Pa>Pc, the sheet conveyance direction Y is the grain direction of the sheet 2, and in a case of Pa<Pc, the sheet width direction X is the grain direction of the sheet 2. That is, the controller 71 can determine the grain direction of the sheet 2 from the calculation result by the calculator 71c. The grain direction of the sheet 2 refers to an arrangement direction of fibers. Depending on the sheet, the fibers may not always be randomly oriented, but may be oriented in a specific direction, and in such a case, a direction and an amount of curl generated on the sheet may change depending on conveyance and heating conditions of the sheet, and an environment such as temperature or humidity. If the stiffness can be determined according to the grain direction of the sheet, such curl can be appropriately corrected, and parameters affecting sheet conveyance and image quality can be appropriately set.

Next, the controller 71 sets a control parameter on the basis of the stiffness of the sheet 2 in the sheet conveyance direction Y and the stiffness of the sheet 2 in the oblique direction (step S8). Specifically, the controller 71 sets the control parameter on the basis of the magnitude relationship between the stiffness Pa and the stiffness Pc obtained by the calculator 71c with the stiffness Pfd of the sheet 2 in the sheet conveyance direction Y and the stiffness Psi of the sheet 2 in the oblique direction as calculation parameters. It is sufficient if correspondence between the magnitude relationship between the stiffnesses Pa and Pc and the control parameter is stored in the storage unit 72 in advance as table data, and when the control parameter is set, the control parameter corresponding to the magnitude relationship between the stiffnesses Pa and Pc obtained by the calculation described above is read from the storage unit 72 and applied.

The control parameter to be set includes at least one of a conveyance parameter of the sheet, a decurling parameter of the sheet, an image formation parameter, or a post-processing parameter. Specific examples of the sheet conveyance parameter include a sheet conveyance speed. Specific examples of the decurling parameter of the sheet include a pressure applied to the sheet by the decurling roller, a contact time between the decurling roller and the sheet, and the like. Specific examples of the image formation parameter include a charging potential by the charging device 23, a transfer current supplied to the primary transfer unit 33 and the secondary transfer roller 33a, a fixing temperature and a fixing pressure in the fixing part 40, and the like. Specific examples of the post-processing parameter include a driving pressure for stapling processing and a driving torque for sheet folding processing. The conveyance parameter and the decurling parameter are parameters set by the sheet conveyance controller 71a. The image formation parameter is a parameter set by the image forming controller 71b. The post-processing parameter is a parameter set by a post-processing controller (not illustrated) included in the controller 71. Note that, the control parameters set in step S8 may be a control parameter other than the control parameters listed here.

Effects of First Embodiment

As described above, the sheet conveyance device according to the first embodiment of the present invention and the image forming apparatus 1 including the sheet conveyance device include the stiffness acquisition part 60 that acquires the stiffness of the sheet 2 in the first direction by bending the sheet 2 in the first direction including a component in the sheet conveyance direction Y, and acquires the stiffness of the sheet 2 in the second direction by bending the sheet 2 in the second direction including a component in the sheet width direction X. As a result, both the stiffness of the sheet 2 in the sheet conveyance direction Y and the stiffness of the sheet 2 in the sheet width direction X can be detected. Thus, even when the stiffness of the sheet 2 is different between the sheet conveyance direction Y and the sheet width direction X, it is possible to prevent degradation in quality of conveying the sheet 2 and image quality. In addition, the control parameter can be set more appropriately as compared with a case where the control parameter is set only on the basis of the stiffness of the sheet 2 in the sheet conveyance direction Y. In addition, to directly measure the stiffness of the sheet 2 in the sheet width direction X, it is necessary to incorporate a large mechanism for bending the sheet 2 in the sheet width direction X into the housing 10; however, according to the first embodiment of the present invention, it is possible to detect the stiffness of the sheet 2 in the sheet width direction X without using such a large mechanism. In addition, in the first embodiment of the present invention, since the stiffness of the sheet 2 is acquired by bending of the sheet 2, it is possible to appropriately cope with a case of handling a special sheet, for example, a coated sheet or the like.

Note that, in the first embodiment, as an example, the case has been described where the stiffness of the sheet 2 is measured by the pressing force received from the sheet 2 when the sheet 2 is bent by the predetermined amount in each of the first stiffness acquisition unit 61 and the second stiffness acquisition unit 62; however, the present invention is not limited to this. For example, the stiffness of the sheet 2 may be measured by an amount of deformation of the sheet 2 when the sheet 2 is bent with a predetermined pressing force in each of the first stiffness acquisition unit 61 and the second stiffness acquisition unit 62. The amount of deformation of the sheet 2 may be measured by an amount of movement (amount of rise) of each of the push-up member 613 and 625 from the home position, or may be measured by a displacement sensor (distance sensor) (not illustrated).

Second Embodiment

Next, a second embodiment of the present invention will be described. An image forming apparatus according to the second embodiment of the present invention is different from the image forming apparatus according to the first embodiment in a configuration of a second stiffness acquisition unit and a control mode of a sheet conveyance controller.

(Configuration of Second Stiffness Acquisition Unit)

Figure 9:
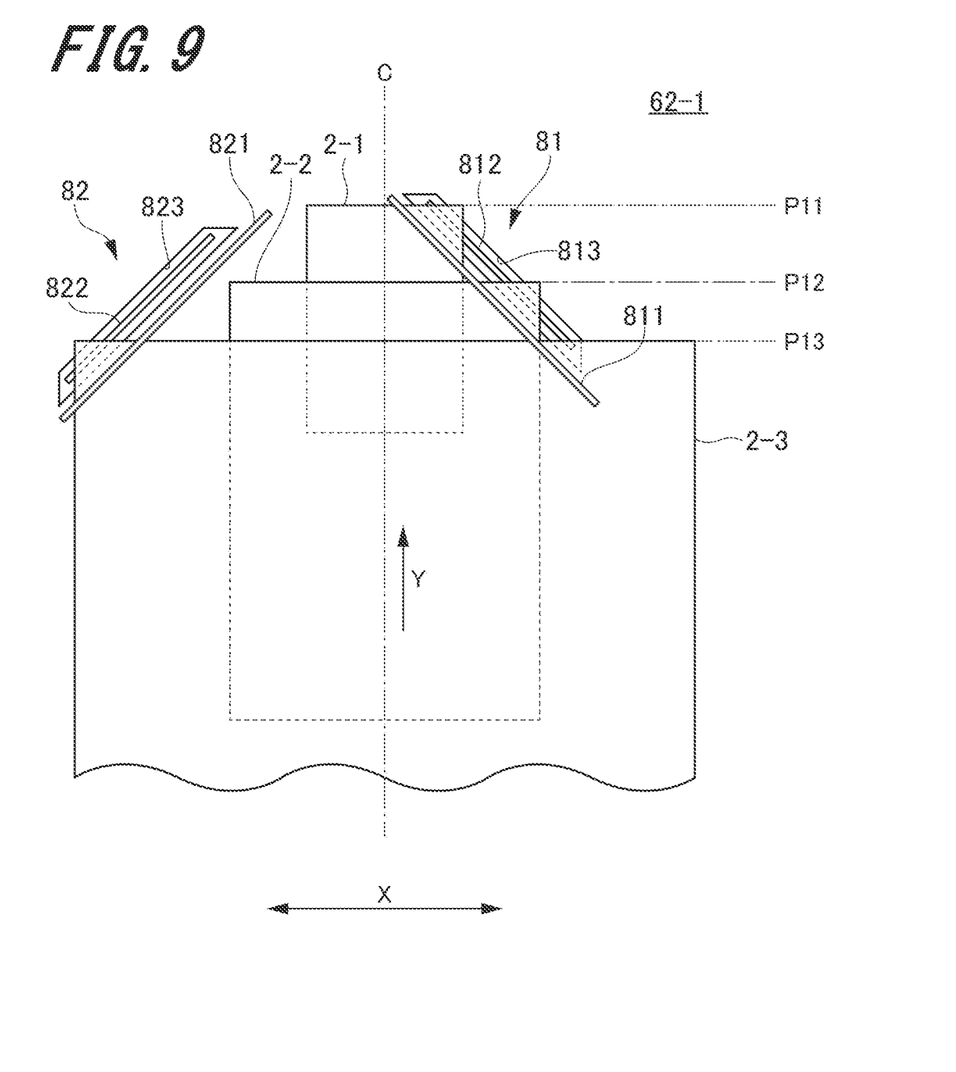
FIG. 9 is a plan view schematically illustrating a configuration example of a second stiffness acquisition unit included in an image forming apparatus according to a second embodiment of the present invention.

FIG. 9 is a plan view schematically illustrating a configuration example of the second stiffness acquisition unit included in the image forming apparatus according to the second embodiment of the present invention.

As illustrated in FIG. 9, a second stiffness acquisition unit 62-1 includes a first bending structure 81 that bends a corner of a sheet having a first sheet size and a second bending structure 82 that bends a corner of a sheet having a second sheet size different from the first sheet size. In the present embodiment, as an example, a case will be described where the sheets having the first sheet size are a sheet 2-1 of a postcard size and a sheet 2-2 of an A4 size, and the sheet having the second sheet size is a sheet 2-3 of an A3 size. Each of the sheets 2-1, 2-2, and 2-3 is conveyed with a sheet width center position aligned with a width direction center position C of the conveyance path 53. In the following description, when it is not necessary to distinguish the sheets 2-1, 2-2, and 2-3 from each other, they are simply described as the sheets 2.

(First Bending Structure)

The first bending structure 81 includes a sheet holding member 811 that holds the sheets 2-1 and 2-2, and a push-up member 812 that pushes up corners of the sheets 2-1 and 2-2 held by the sheet holding member 811. The sheet holding member 811 is, for example, a rubber member, and is formed in a long plate shape. The sheet holding member 811 holds the sheets 2-1 and 2-2 by pressing the sheets 2-1 and 2-2 against a conveyance guide member (not illustrated) that guides conveyance of the sheet 2. The push-up member 812 bends the corners of the sheets 2-1 and 2-2 by pushing up the corners of the sheets 2-1 and 2-2 through a long hole 813 provided in the conveyance guide member. The sheet holding member 811 and the push-up member 812 are disposed to be inclined by 45 degrees in the counterclockwise direction of FIG. 9 with respect to the sheet conveyance direction Y.

(Second Bending Structure)

The second bending structure 82 includes a sheet holding member 821 that holds the sheet 2-3 and a push-up member 822 that pushes up a corner of the sheet 2-3 held by the sheet holding member 821. The sheet holding member 821 is, for example, a rubber member, and is formed in a long plate shape. The sheet holding member 821 holds the sheet 2-3 by pressing the sheet 2-3 against a conveyance guide member that guides conveyance of the sheet 2. The push-up member 822 bends the corner of the sheet 2-3 by pushing up the corner of the sheet 2-3 through a long hole 823 provided in the conveyance guide member. The sheet holding member 821 and the push-up member 822 are disposed to be inclined by 45 degrees in the clockwise direction of FIG. 9 with respect to the sheet conveyance direction Y. That is, an inclination direction of the sheet holding member 821 and the push-up member 822 and an inclination direction of the sheet holding member 811 and the push-up member 812 described above are opposite directions to each other. In addition, the sheet holding member 821 and the push-up member 822 are configured to bend a corner of the left side of the sheet 2-3 in FIG. 9, and the sheet holding member 811 and the push-up member 812 are configured to bend a corner of the right side of the sheets 2-1 and 2-2 in FIG. 9.

(Control Mode of Sheet Conveyance Controller)

The sheet conveyance controller 71a controls the sheet conveyance part 50 to change a stop position of the sheet 2 depending on a sheet size, on the conveyance path 53 on which the second stiffness acquisition unit 62-1 is disposed. Specifically, when the sheet 2 conveyed toward the second stiffness acquisition unit 62 is the sheet 2-1 of the postcard size, the sheet conveyance controller 71a controls the sheet conveyance part 50 so that the sheet 2-1 stops at a first stop position P11. When the sheet 2 conveyed toward the second stiffness acquisition unit 62 is the sheet 2-2 of the A4 size, the sheet conveyance controller 71a controls the sheet conveyance part 50 so that the sheet 2-2 stops at a second stop position P12. When the sheet 2 conveyed toward the second stiffness acquisition unit 62 is the sheet 2-3 of the A3 size, the sheet conveyance controller 71a controls the sheet conveyance part 50 so that the sheet 2-3 stops at a third stop position P13.

By changing the stop position of the sheet 2 depending on the sheet size in this manner, for the sheets 2-1 and 2-2, the stiffnesses of the sheets 2-1 and 2-2 in the oblique direction can be acquired by a measurement method similar to that in the first embodiment by bending the corners of the sheets 2-1 and 2-2 with the first bending structure 81. In addition, for the sheet 2-3, the stiffness of the sheet 2-3 in the oblique direction can be acquired by a measurement method similar to that in the first embodiment by bending the corner of the sheet 2-3 with the second bending structure 82.

In the second embodiment of the present invention, it is possible to acquire the stiffnesses of the sheets having different sheet sizes without moving the second stiffness acquisition unit 62-1 in the sheet width direction X. For this reason, the stiffness of the sheet 2 in the oblique direction can be efficiently acquired. In addition, since a mechanism for moving the stiffness acquisition unit in the sheet width direction X is unnecessary, the configuration can be simplified and the cost can be reduced.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

1 . . . image forming apparatus
2 . . . sheet
30 . . . image forming part
50 . . . sheet conveyance part
51a . . . sheet feeder
53 . . . conveyance path
56 . . . merging position
57 . . . transfer position (image forming position)
60 . . . stiffness acquisition part
61 . . . first stiffness acquisition unit
62, 62-1 . . . second stiffness acquisition unit
71 . . . controller
71c . . . calculator
81 . . . first bending structure
82 . . . second bending structure
X . . . sheet width direction
Y . . . sheet conveyance direction

The invention claimed is:

1. A sheet conveyance device comprising:
   a sheet conveyance part that conveys a sheet along a conveyance path; and
   a stiffness acquisition part that acquires a stiffness of the sheet in a first direction including a component of a sheet conveyance direction by bending the sheet in the first direction, and acquires a stiffness of the sheet in a second direction including a component in a sheet width direction orthogonal to the sheet conveyance direction by bending the sheet in the second direction.

2. The sheet conveyance device according to claim 1, wherein
   a stiffness of the sheet in the sheet width direction is acquired on a basis of the stiffness of the sheet in the first direction and the stiffness of the sheet in the second direction.

3. The sheet conveyance device according to claim 2, wherein
   a stiffness per unit area is acquired on the basis of the stiffness of the sheet in the first direction and the stiffness of the sheet in the second direction.

4. The sheet conveyance device according to claim 1, wherein
   the stiffness acquisition part acquires the stiffness by pressing the sheet.

5. The sheet conveyance device according to claim 4, wherein
   the stiffness acquisition part includes a sheet holding part disposed in parallel to at least one of the first direction or the second direction, and a pressing part that presses the sheet held by the sheet holding part.

6. The sheet conveyance device according to claim 1, wherein
   when pressing the sheet, the stiffness acquisition part acquires the stiffness on a basis of at least one of a pressing force, an amount of deformation of the sheet, an amount of movement of a member in contact with the sheet, or an amount of displacement.

7. The sheet conveyance device according to claim 1, wherein
   the second direction is a direction oblique to the sheet conveyance direction.

8. The sheet conveyance device according to claim 7, wherein
   the second direction is an oblique direction at an angle of 45 degrees with respect to the sheet conveyance direction.

9. The sheet conveyance device according to claim 1, wherein
   the first direction is a direction parallel to the sheet conveyance direction.

10. The sheet conveyance device according to claim 1, wherein
    the conveyance path includes a first conveyance path leading from a sheet feeder to a sheet ejector via an image forming position, and a second conveyance path branching from the first conveyance path on an upstream side in the sheet conveyance direction from the sheet ejector and merging with the first conveyance path on a downstream side in the sheet conveyance direction from the sheet feeder, and
    the stiffness acquisition part is disposed at a location that is on the downstream side in the sheet conveyance direction from a merging position of the first conveyance path and the second conveyance path and is on the upstream side in the sheet conveyance direction from the image forming position.

11. The sheet conveyance device according to claim 1, further comprising
    a controller that sets a conveyance parameter of the sheet on a basis of the stiffness of the sheet in the first direction and the stiffness of the sheet in the second direction.

12. The sheet conveyance device according to claim 1, further comprising
    a controller that sets a decurling parameter of the sheet on a basis of the stiffness of the sheet in the first direction and the stiffness of the sheet in the second direction.

13. The sheet conveyance device according to claim 1, wherein
    the stiffness acquisition part is disposed along the conveyance path and includes a detector capable of measuring a value corresponding to the stiffness.

14. The sheet conveyance device according to claim 1, wherein
    the stiffness acquisition part measures a stiffness of the sheet by a pressing force received from the sheet when the sheet is bent by a predetermined amount.

15. The sheet conveyance device according to claim 1, wherein
    the stiffness acquisition part measures a stiffness of the sheet by an amount of deformation of the sheet when the sheet is bent with a predetermined pressing force.

16. The sheet conveyance device according to claim 1, wherein
    the stiffness acquisition part includes a first stiffness acquisition unit that acquires a stiffness of the sheet by bending the sheet in the first direction, and a second stiffness acquisition unit that acquires a stiffness of the sheet by bending the sheet in the second direction.

17. The sheet conveyance device according to claim 16, wherein
    the second stiffness acquisition unit is provided to be movable in the sheet width direction, and acquires a stiffness of the sheet by bending a corner of the sheet.

18. The sheet conveyance device according to claim 16, wherein
    the second stiffness acquisition unit includes a first bending structure that bends a corner of a sheet having a first sheet size and a second bending structure that bends a corner of a sheet having a second sheet size different from the first sheet size.

19. The sheet conveyance device according to claim 18, further comprising
    a sheet conveyance controller that controls the sheet conveyance part to change a stop position of the sheet depending on a sheet size on the conveyance path on which the second stiffness acquisition unit is disposed.

20. An image forming apparatus comprising:
    the sheet conveyance device according to claim 1; and
    an image forming part that forms an image on a sheet conveyed by the sheet conveyance device.

21. The image forming apparatus according to claim 20, further comprising
    a controller that sets an image formation parameter on a basis of the stiffness of the sheet in the first direction and the stiffness of the sheet in the second direction.

22. The image forming apparatus according to claim 20, further comprising a controller that sets a post-processing parameter on a basis of the stiffness of the sheet in the first direction and the stiffness of the sheet in the second direction.

\* \* \* \* \*